United States Patent
Böhringer

[11] Patent Number: 6,047,696
[45] Date of Patent: Apr. 11, 2000

[54] MODULATING SOLAR-POWER REGULATOR

[76] Inventor: Volker Böhringer, Haldenstrasse 42, D-75417 Mühlacker, Germany

[21] Appl. No.: 09/142,622
[22] PCT Filed: Mar. 13, 1997
[86] PCT No.: PCT/DE97/00502
   § 371 Date: Sep. 10, 1998
   § 102(e) Date: Sep. 10, 1998
[87] PCT Pub. No.: WO97/34111
   PCT Pub. Date: Sep. 18, 1997

[30] Foreign Application Priority Data

| Mar. 13, 1996 | [DE] | Germany | 196 09 825 |
| Mar. 26, 1996 | [DE] | Germany | 196 11 865 |
| Apr. 15, 1996 | [DE] | Germany | 196 14 833 |
| May 2, 1996 | [DE] | Germany | 196 17 577 |
| Jun. 15, 1996 | [DE] | Germany | 196 23 978 |
| Jul. 9, 1996 | [DE] | Germany | 196 27 569 |
| Aug. 1, 1996 | [DE] | Germany | 196 31 057 |
| Aug. 23, 1996 | [DE] | Germany | 196 34 068 |
| Sep. 3, 1996 | [DE] | Germany | 196 35 626 |
| Oct. 16, 1996 | [DE] | Germany | 196 42 642 |
| Nov. 4, 1996 | [DE] | Germany | 196 45 117 |
| Nov. 21, 1996 | [DE] | Germany | 196 48 279 |
| Dec. 25, 1996 | [DE] | Germany | 196 54 217 |
| Jan. 3, 1997 | [DE] | Germany | 197 00 129 |
| Jan. 28, 1997 | [DE] | Germany | 197 02 883 |

[51] Int. Cl.⁷ .................................................. F24J 2/40
[52] U.S. Cl. ................................ 126/587; 126/714
[58] Field of Search ............................ 126/585, 587, 126/595, 597, 640, 641, 642, 400, 714

[56] References Cited

U.S. PATENT DOCUMENTS

| 4,062,349 | 12/1977 | Birnbreier | 126/587 |
| 4,275,395 | 6/1981 | Wieder | 126/587 |
| 4,353,410 | 10/1982 | Godard et al. | 126/585 |
| 4,375,806 | 3/1983 | Nishman | 126/585 |
| 4,397,301 | 8/1983 | Onno | 126/640 |
| 4,420,032 | 12/1983 | Van Koppen et al. | 126/585 |
| 4,644,935 | 2/1987 | Gallagher | 126/640 |
| 4,911,228 | 3/1990 | Meshulam | 126/585 |
| 5,601,075 | 2/1997 | Lai | 126/585 |

FOREIGN PATENT DOCUMENTS

| 2753810 | 6/1979 | Germany . |
| 9207743 | 11/1992 | Germany . |

*Primary Examiner*—Ira S. Lazarus
*Assistant Examiner*—Sara Clarke
*Attorney, Agent, or Firm*—Dr. Paul Vincent

[57] ABSTRACT

The invention concerns a method of controlling a heat accumulator. According to the method the heat carrier, in contrast to conventional methods, is not controlled on the basis of differences in temperatures between the energy collector and heat accumulator but as a function of the internal energy in the energy collector, the connection line between the energy collector and the heat accumulator and in the heat accumulator.

6 Claims, 1 Drawing Sheet

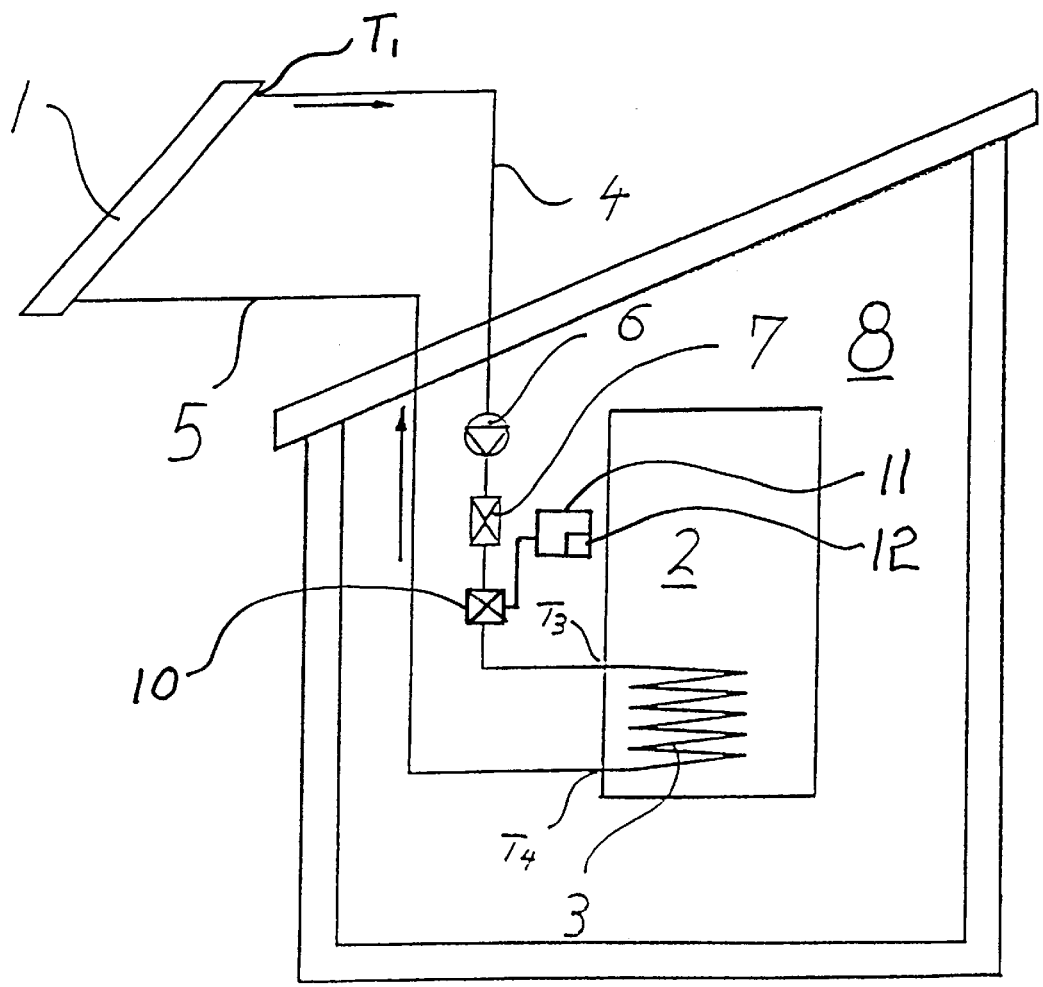

MODULATING SOLAR-POWER REGULATOR

BACKGROUND OF THE INVENTION

The invention concerns a method for the use of the thermal accumulator of a solar power installation. The heat accumulator of a thermal solar power installation is usually charged by a two point regulator having hysteresis. As soon as the temperature of the solar power collector exceeds that of the heat accumulator by a particular amount, a pump is switched on which pumps a heat carrier from the solar collector into the heat accumulator. The heat carrier releases a portion of its heat at this location and flows back into the solar power collector via a return conduit. When the temperature difference between the collector and the heat accumulator reduces during pump operation to below a particular predetermined value, the pump is switched-off. This simple regulation has the disadvantage that the heat losses at the beginning of the pumping procedure as well as the efficiency of the solar collector are not taken into account. Also known in the art is a regulation device having a conduit adjustment for solar power thermal installations (G 92 07 743.9) with which one attempts to optimize the energy input of the solar collector into the heat accumulator by evaluating the time gradient of the collector temperature and the time gradient of the temperature difference between the heat carrier entering into the heat accumulator and exiting out of the heat accumulator. These methods have the common feature of regulating the flow of the heat carrier through the collector and heat accumulator in a temperature dependent fashion.

SUMMARY OF THE INVENTION

The invention has, in contrast thereto, the advantage that the transport device is only switched on when the internal energy of the heat accumulator is thereby increased. The solar installation is regulated using the internal energy thereof and of its components also taking into consideration installation specific quantities resulting from physical characteristics of the solar installation such as volumes and temperatures and e.g. can be input as an additive term in the minimum collector temperature, to facilitate a condition adapted operation of the solar installation. The avoidance of unnecessary switching-on minimizes the energy requirements of the transport device.

In an additional advantageous configuration of the method, the transport device is only switched-on when the switch-on condition in accordance with specific method steps is satisfied and when the second derivative with respect to time of the difference between the internal energy of the heat carrier located in the energy collector (1) and in the connection conduit (4) and the internal energy extracted from the heat accumulator (2) in accordance with certain method steps is less than zero (<0) so that the heat input is maximized while simultaneously minimizing the energy requirements for transporting the heat carrier.

The invention having the characterizing features claimed has, in contrast thereto, the advantage that the heat supply of the energy collector to the heat user is improved and the efficiency of the energy collector is increased and the heat losses in the connecting conduits are minimized since the transport device can already be switched-on as soon as the temperature of the heat carrier exceeds the temperature of the heat user.

In accordance with an additional advantageous configuration of a device for carrying out the method according to the invention, the transport device is a pump so that the heat carrier is circulated independent of the flow resistance of the solar collector, the connecting conduits and the heat exchanger.

In accordance with an additional advantageous configuration of a device for carrying out the method according to the invention, the transport device and the check valve are replaced by a regulated flow-through valve so that the energy requirements of the installation are minimized by taking advantage of the natural convection of the heat carrier to transport the heat collected in the energy collector into the heat accumulator.

In accordance with an additional advantageous configuration of a device for carrying out the method in accordance with any one of the claims 1 through 4, the energy collector is a thermal solar power collector, the heat accumulator stores sensible (feelable) and/or latent heat and the heat carrier is a fluid (water-glycin-mixture), so that the costs of the installation remain low.

A preferred embodiment of a method for operating a thermal accumulator of a solar power installation in accordance with the invention comprises the steps of:

1.1 determining an internal energy of a heat carrier in an energy collector and in a connecting conduit between an output of the energy collector and a heat accumulator input;

1.2 determining an internal energy which would be removed from the heat accumulator if a heat carrier volume, equal to a volume of heat carrier in the energy collector and in the connecting conduit, were removed from the heat accumulator with heat carrier temperature $T_4$ at an output of the heat accumulator;

1.3 switching-on a device to transport the heat carrier out of the energy collector and into the heat accumulator should at least one of the following conditions occur:

1.3.1 the internal energy determined in accordance with method step 1.1 is larger by an amount $\Delta E$ than the internal energy determined in accordance with step 1.2., $\Delta E$ being determined and specified by at least one of physical characteristics of the solar installation, volumes, and temperatures;

1.3.2 a temperature $T_1$ of the heat carrier in the energy collector exceeds a temperature $T_5$, is larger than an ambient temperature plus an amount $\Delta T_1$, and is larger than the temperature $T_4$ of the heat carrier at the output of the heat accumulator plus an amount $\Delta T_2$;

1.4 switching-off the transport device should at least one of the following conditions occurs:

1.4.1 switching-on is carried out in accordance with step 1.3.1 and at least the heat carrier located in the energy collector and in the connecting conduit is transported into the heat accumulator and a temperature $T_3$ of the heat carrier at the input of the heat accumulator is smaller than the temperature $T_4$ of the heat carrier at the output of the accumulator plus an amount $\Delta T_3$;

1.4.2 switching-on is effected in accordance with step 1.3.2 and the temperature $T_1$ of the heat carrier in the energy collector is smaller than the temperature $T_4$ of the heat carrier at the output of the heat accumulator plus an amount $\Delta T_4$.

Another preferred embodiment of the method in accordance with the invention for use of a thermal collector of a solar power installation comprises the steps of:

2.1 determining an internal energy of heat carrier in an energy collector and in a connecting conduit between an output of the energy collector and a heat accumulator input;

2.2 determining an internal energy which would be removed from the heat accumulator if a heat carrier volume corresponding to a volume of the heat carrier in the energy collector and in the connecting conduit were removed from the heat accumulator having an output temperature $T_4$ for the heat carrier exiting the heat accumulator;

2.3 switching-on a device for transporting the heat carrier out of the energy collector and into the heat accumulator should at least one of the following conditions occur:

2.3.1 the amount of internal energy determined in accordance with step 2.1 is larger by an amount $\Delta E$, than the internal energy determined in accordance with step 2.2., $\Delta E$ being determined and specified by at least one of physical characteristics of the solar installation, volumes, and temperatures;

2.3.2 a temperature $T_1$ of the heat carrier in the energy collector
exceeds a temperature $T_6$ and
is larger than the temperature $T_4$ of the heat carrier at an accumulator output plus an amount $\Delta T_5$;

2.4 switching-off the transport device should at least one of the following conditions occur:

2.4.1 switch-on was effected in accordance with step 2.3.1 and at least the heat carrier located in the energy collector and in the connecting conduit is transported into the heat accumulator and
a temperature $T_3$ of the heat carrier at the input of the heat accumulator is smaller than the temperature $T_4$ of the heat carrier at the output of the heat accumulator plus an amount $\Delta T_6$;

2.4.2 switching-on was effected in accordance with step 2.3.2 and the temperature $T_1$ of the heat carrier in the energy collector is smaller than the temperature $T_4$ of the heat carrier at the output of the heat accumulator plus an amount $\Delta T_7$.

Another embodiment of a method in accordance with the invention for use of a thermal collector of a solar power installation, comprises the steps of:

4.1 determining an internal energy of a heat carrier in an energy collector and in portions of connecting conduits external to a heat accumulator and to a heat user supplied therefrom;

4.2 determining an internal energy which would be removed from the heat accumulator if a heat carrier volume corresponding to a volume of heat carrier in the energy collector and in the portions of connecting conduits external to the heat accumulator and to the heat user supplied thereby were removed from the heat accumulator having an output temperature $T_4$ for the heat carrier exiting the heat accumulator;

4.3 switching-on a device to transport the heat carrier out of the energy collector and into the heat accumulator if at least one of the following conditions occur;

4.3.1 the internal energy determined in accordance with step 4.1 is larger by an amount $\Delta E$ than the internal energy determined in accordance with method step 4.2, $\Delta E$ being determined and specified by at least one of physical characteristics of the solar installation, volumes, and temperatures;

4.3.2 a temperature $T_1$ of the heat carrier in the energy collector
is larger than a temperature of the heat user supplied by the heat accumulator plus an amount $\Delta T_8$ and
is larger than the temperature $T_4$ of the heat carrier at an output of the heat accumulator plus an amount $\Delta T_9$, 4.3.3 an ambient temperature is less than said temperature of the heat user
an average temperature of the heat carrier in the energy collector and in the portions of connecting conduits external to the heat accumulator and to the heat user supplied thereby
is larger than the temperature of the heat user plus an amount $\Delta T_{14}$, and
is larger than the temperature $T_4$ of the heat carrier at the output of the heat accumulator plus an amount $\Delta T_{10}$;

4.4 switching-off the transport device should at least one of the following conditions occur:

4.4.1 switching-on is effected in accordance with condition 4.3.1 and at least the heat carrier located in the energy collector and in the portions of connecting conduits external to the heat accumulator and to the heat user supplied thereby is transported into the heat accumulator and a temperature $T_3$ of the heat carrier at an input of the heat accumulator is less than the temperature $T_4$ of the heat carrier at the output of the heat accumulator plus an amount $\Delta T_{11}$;

4.4.2 switch-on is effected in accordance with step 4.3.2 and the temperature $T_1$ of the heat carrier in the energy collector is smaller than the temperature $T_4$ of the heat carrier at the output of the heat accumulator plus an amount $\Delta T_{12}$;

4.4.3 switch-on is effected in accordance with step 4.3.3 and the temperature $T_1$ of the heat carrier in the energy collector is less than the temperature of the heat user plus an amount $\Delta T_{13}$.

The invention also concerns a solar installation device comprising a solar collector, a heat accumulator, a connecting conduit between the heat accumulator and the solar collector, a transport device disposed on the connecting conduit, a check valve disposed on the connecting conduit, a first temperature sensor disposed on the solar collector, a second temperature sensor disposed at an input to the heat accumulator, a third temperature sensor disposed at an output of the heat accumulator, and an electrical regulation device in communication with the first, second and third temperature sensors and connected to the transport device, the electrical regulation device having a memory unit for storing characteristic physical quantities of the solar installation including at least one of a volume, a heat capacity, a heat conductivity and a pumping capacity, wherein the regulation device calculates internal energies in the solar collector, the heat accumulator, and the connecting conduit from temperatures of the first, second and third temperature sensors and the characteristic physical quantities of the solar installation, and wherein the internal energies are used as regulating quantities for the electrical regulation device to switch the transport device on and off.

Further advantages and advantageous configurations can be extracted from the following description, the claims and the drawing.

An embodiment of the invention is shown in the drawing and described more closely below.

BRIEF DESCRIPTION OF THE DRAWING

FIG. 1 shows a representation of the regulated system.

DESCRIPTION OF THE PREFERRED EMBODIMENT

A solar collector 1 is shown in FIG. 1 connected by means of a connecting conduits 4; 5 to a heat accumulator 2. The heat carrier warmed in the solar collector 1 is transported by a pump 6 through the connecting conduit 4 into the heat exchanger 3 located in the heat accumulator 2. It gives up its heat at this location and leaves the heat exchanger 3 and the accumulator 2 with a temperature $T_4$. It flows back through connecting conduit 5 into the solar collector in order to once more be warmed, assuming sufficient radiation is present. The check valve 7 prevents an undesirable return flow of the heat carrier out of the accumulator 2 and into the solar collector 1 when the pump is switched off. In this example, the heat user 8 is a building which can be heated by a heat generator (furnace, not shown) alternatively to the heat coming from the heat accumulator 2. The heat user 8 could also be a shower, a washing machine, an endothermic production process or the like.

Clearly, the method for economical use of a heat accumulator in accordance with the invention can also be utilized if instead of the solar collector 1, heat exchangers, heat pipes or heat sources are used as the energy collector for the heat accumulator 2.

All of the features shown in the description, in the subsequent claims and in the drawing can be important to the invention individually as well as in arbitrary combination.

Reference symbol list 1 solar collector
2 heat accumulator
3 heat exchanger
4 connecting conduit between the output of the solar collector and the input of the heat exchanger
5 connecting conduit between the output of the heat exchanger and the input of the solar collector
6 pump
7 check valve
8 heat user
$T_1$ average temperature of the heat carrier in the solar collector
$T_2$ average temperature of the heat carrier in the connecting conduit between the output of the solar collector and the input of the heat exchanger
$T_3$ temperature of the heat carrier at the input of the heat exchanger
$T_4$ temperature of the heat carrier at the output of the heat exchanger
10 flow valve
11 electrical regulation device
12 memory unit In the claims:

1. A method for operating a thermal accumulator of a solar power installation, comprising the steps of:

1.1 determining an internal energy of a heat carrier in an energy collector and in a connecting conduit between an output of said energy collector and a heat accumulator input;

1.2 determining an internal energy which would be removed from said heat accumulator if a heat carrier volume, equal to a volume of heat carrier in said energy collector and in said connecting conduit, were removed from said heat accumulator with heat carrier temperature $T_4$ at an output of said heat accumulator;

1.3 switching-on a device to transport said heat carrier out of said energy collector and into said heat accumulator should at least one of the following conditions occur:

1.3.1 said internal energy determined in accordance with method step 1.1 is larger by an amount $\Delta E$ than said internal energy determined in accordance with step 1.2., $\Delta E$ being determined and specified by at least one of physical characteristics of the solar installation, volumes, and temperatures;

1.3.2 a temperature $T_1$ of said heat carrier in said energy collector
   exceeds a temperature $T_5$,
   is larger than an ambient temperature plus an amount $\Delta T_1$, and
   is larger than said temperature $T_4$ of said heat carrier at said output of said heat accumulator plus an amount $\Delta T_2$;

1.4 switching-off said transport device should at least one of the following conditions occurs:

1.4.1 switching-on is carried out in accordance with step 1.3.1 and at least said heat carrier located in said energy collector and in said connecting conduit is transported into said heat accumulator and
   a temperature $T_3$ of said heat carrier at said input of said heat accumulator is smaller than the temperature $T_4$ of the heat carrier at the output of the accumulator plus an amount $\Delta T_3$.

1.4.2 switching-on is effected in accordance with step 1.3.2 and said temperature $T_1$ of said heat carrier in said energy collector is smaller than said temperature $T_4$ of said heat carrier at said output of said heat accumulator plus an amount $\Delta T_4$.

2. The method of claim 1, characterized in that a switching condition is satisfied in accordance with step 1.3.1 and said transport device is first switched-on when a second derivative with respect to time of a difference between an internal energy of said heat carrier located in said energy collector and in said connection conduit and an internal energy removed from said heat accumulator in accordance with step 1.2 is less than zero.

3. Method for use of a thermal collector of a solar power installation comprising the steps of:

2.1 determining an internal energy of heat carrier in an energy collector and in a connecting conduit between an output of said energy collector and a heat accumulator input;

2.2 determining an internal energy which would be removed from said heat accumulator if a heat carrier volume corresponding to a volume of said heat carrier in said energy collector and in said connecting conduit were removed from said heat accumulator having an output temperature $T_4$ for said heat carrier exiting said heat accumulator;

2.3 switching-on a device for transporting said heat carrier out of said energy collector and into said heat accumulator should at least one of the following conditions occur:

2.3.1 said amount of internal energy determined in accordance with step 2.1 is larger by an amount $\Delta E$, than said internal energy determined in accordance with step 2.2., $\Delta E$ being determined and specified by at least one of physical characteristics of the solar installation, volumes, and temperatures;

2.3.2 a temperature $T_1$ of said heat carrier in said energy collector
   exceeds a temperature $T_6$ and
   is larger than said temperature $T_4$ of said heat carrier at an accumulator output plus an amount $\Delta T_5$;

2.4 switching-off said transport device should at least one of the following conditions occur:

2.4.1 switch-on was effected in accordance with step 2.3.1 and at least said heat carrier located in said energy collector and in said connecting conduit is transported into said heat accumulator and a temperature $T_3$ of said heat carrier at said input of said heat accumulator is smaller than said temperature $T_4$ of said heat carrier at said output of said heat accumulator plus an amount $\Delta T_6$;

2.4.2 switching-on was effected in accordance with step 2.3.2 and said temperature $T_1$ of said heat carrier in said energy collector is smaller than said temperature $T_4$ of said heat carrier at said output of said heat accumulator plus an amount $\Delta T_7$.

4. The method of claim 3, characterized in that a switching condition is satisfied in accordance with step 2.3.1 and said transport device is first switched-on when a second derivative with respect to time of a difference between an internal energy of said heat carrier located in said energy collector and in said connection conduit and an internal energy which is removed from said heat accumulator in accordance with step 2.2 is less than zero.

5. A method for use of a thermal collector of a solar power installation, comprising the steps of:

4.1 determining an internal energy of a heat carrier in an energy collector and in portions of connecting conduits external to a heat accumulator and to a heat user supplied therefrom;

4.2 determining an internal energy which would be removed from said heat accumulator if a heat carrier volume corresponding to a volume of heat carrier in said energy collector and in said portions of connecting conduits external to said heat accumulator and to said heat user supplied thereby were removed from said heat accumulator having an output temperature $T_4$ for said heat carrier exiting said heat accumulator;

4.3 switching-on a device to transport said heat carrier out of said energy collector and into said heat accumulator if at least one of the following conditions occur;

4.3.1 said internal energy determined in accordance with step 4.1 is larger by an amount $\Delta E$ than said internal energy determined in accordance with method step 4.2, $\Delta E$ being determined and specified by at least one of physical characteristics of the solar installation, volumes, and temperatures;

4.3.2 a temperature $T_1$ of said heat carrier in said energy collector is larger than a temperature of said heat user supplied by said heat accumulator plus an amount $\Delta T_5$ and is larger than said temperature $T_4$ of said heat carrier at an output of said heat accumulator plus an amount $\Delta T_9$.

4.3.3 an ambient temperature is less than said temperature of said heat user an average temperature of said heat carrier in said energy collector and in said portions of connecting conduits external to said heat accumulator and to said heat user supplied thereby is larger than said temperature of said heat user plus an amount $\Delta T_{14}$, and is larger than said temperature $T_4$ of said heat carrier at said output of said heat accumulator plus an amount $\Delta T_{10}$;

4.4 switching-off said transport device should at least one of the following conditions occur:

4.4.1 switching-on is effected in accordance with condition 4.3.1 and at least said heat carrier located in said energy collector and in said portions of connecting conduits external to said heat accumulator and to said heat user supplied thereby is transported into said heat accumulator and a temperature $T_3$ of said heat carrier at an input of said heat accumulator is less than said temperature $T_4$ of said heat carrier at said output of said heat accumulator plus an amount $\Delta T_{11}$.

4.4.2 switch-on is effected in accordance with step 4.3.2 and said temperature $T_1$ of said heat carrier in said energy collector is smaller than said temperature $T_4$ of said heat carrier at said output of said heat accumulator plus an amount $\Delta T_{12}$.

4.4.3 switch-on is effected in accordance with step 4.3.3 and said temperature $T_1$ of said heat carrier in said energy collector is less than said temperature of said heat user plus an amount $\Delta T_{13}$.

6. A solar installation device comprising:

a solar collector;

a heat accumulator;

a connecting conduit between said heat accumulator and said solar collector;

a transport device disposed in said connecting conduit;

a check valve disposed in said connecting conduit;

a first temperature sensor disposed on said solar collector;

a second temperature sensor disposed at an input to said heat accumulator;

a third temperature sensor disposed at an output of said heat accumulator; and an electrical regulation device in communication with said first, second and third temperature sensors and connected to said transport device, said electrical regulation device having a memory unit for storing characteristic physical quantities of the solar installation including at least one of a volume, a heat capacity, a heat conductivity and a pumping capacity, wherein said regulation device calculates internal energies in said solar collector, said heat accumulator, and said connecting conduit from temperatures of said first, second and third temperature sensors and said characteristic physical quantities of the solar installation, and wherein said internal energies are used as regulating quantities for said electrical regulation device to switch said transport device on and off.

* * * * *